Oct. 29, 1963 J. L. MILLER 3,108,651
FLUID BRAKE PEDAL ARRANGEMENT
Filed Sept. 22, 1961 4 Sheets-Sheet 1
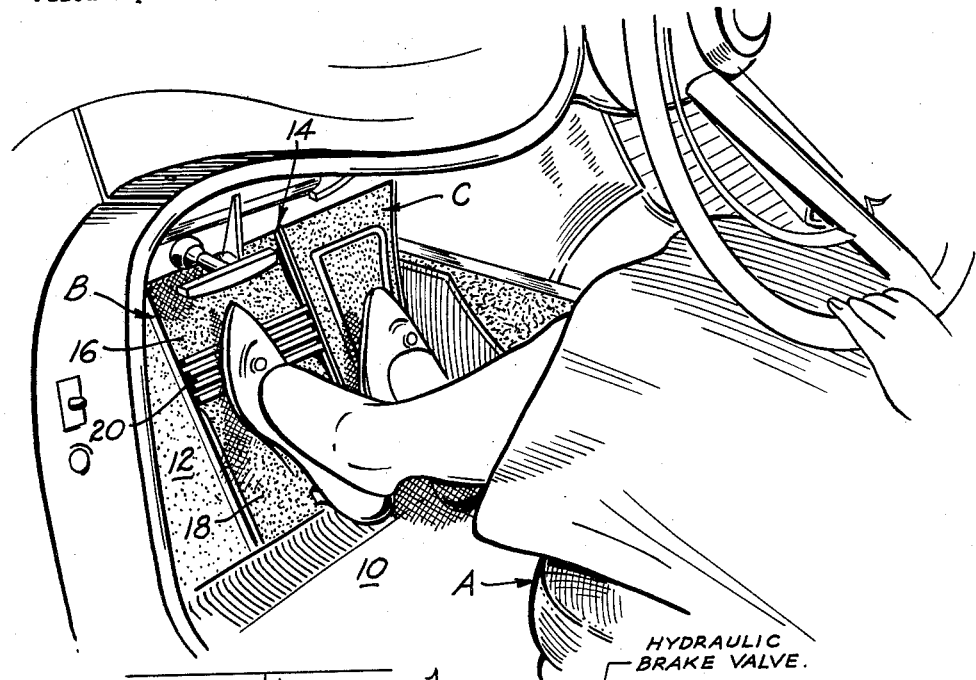
FIG_1
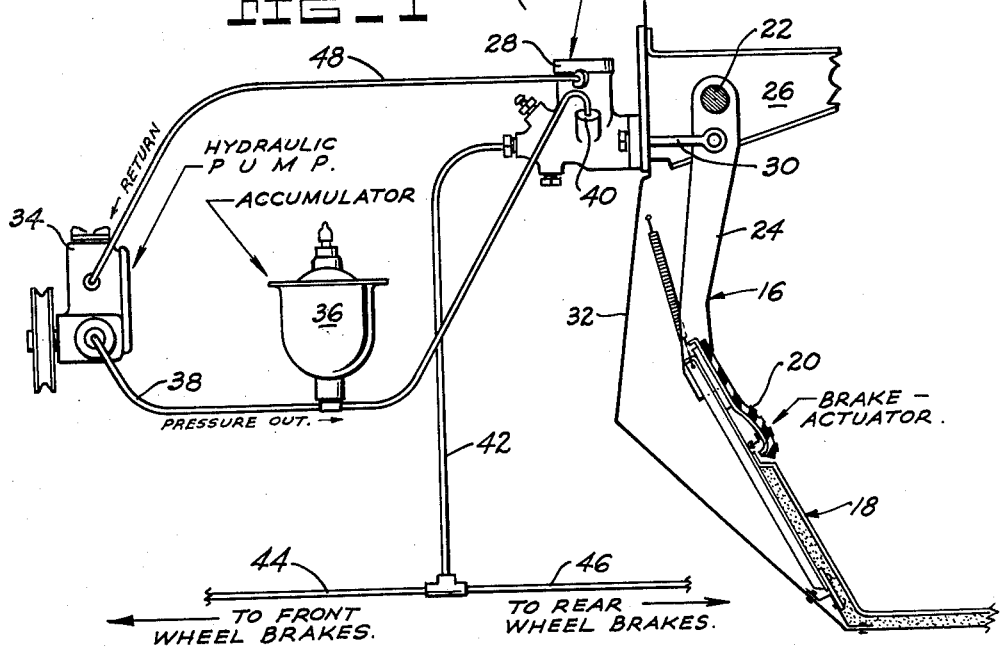
FIG_2
INVENTOR
JOHN L. MILLER.
BY
William P. Hickey
ATTORNEY

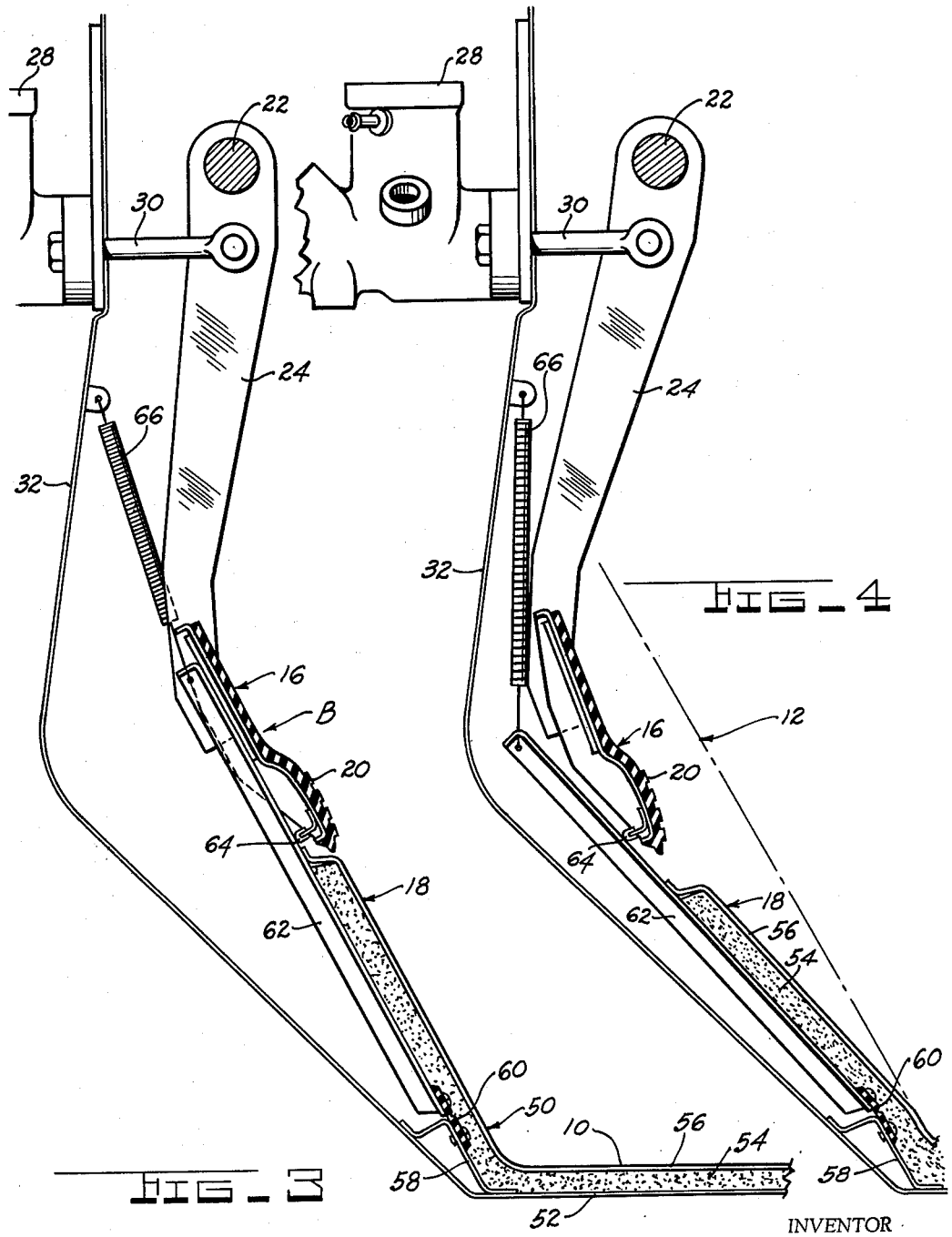

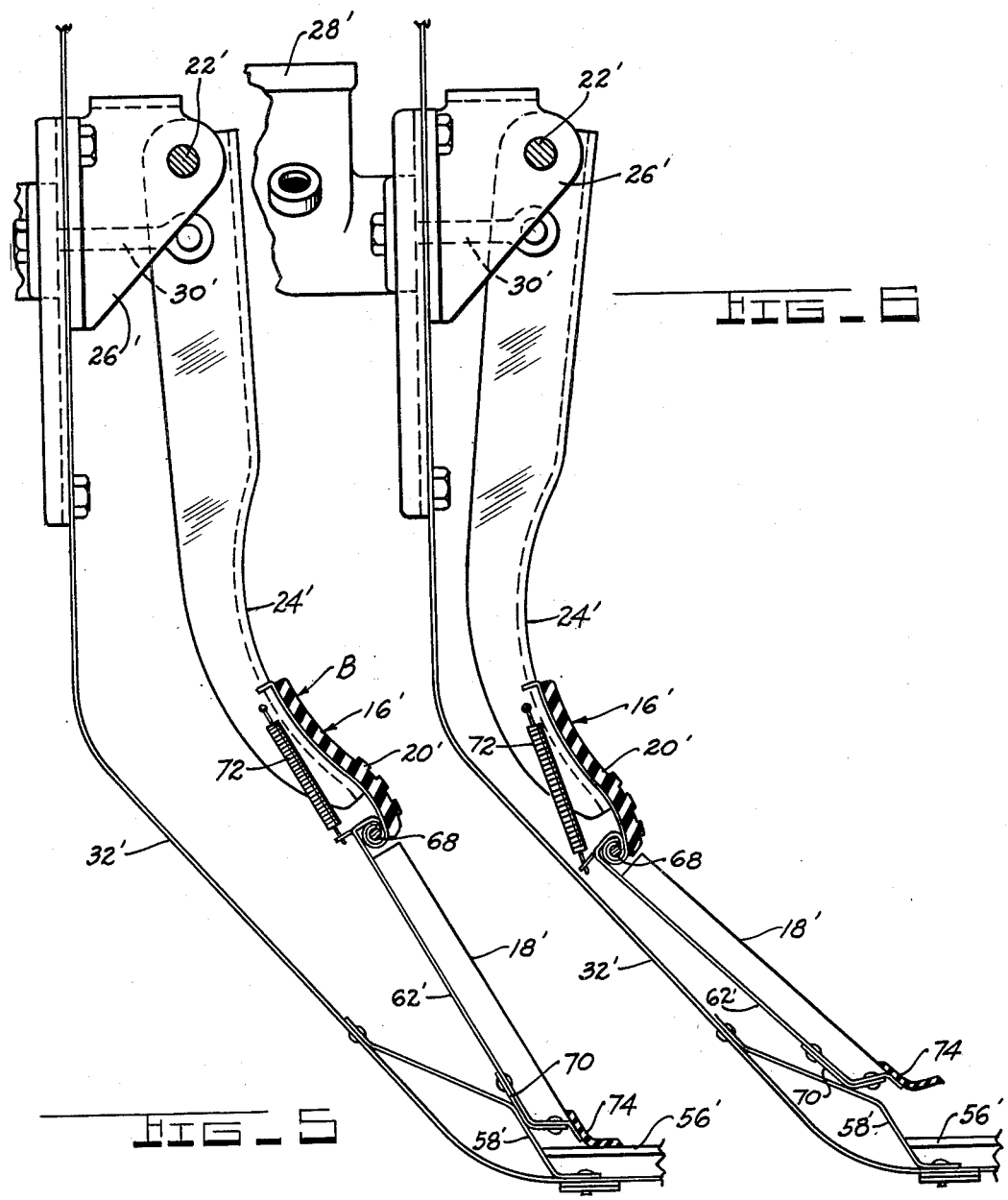

Oct. 29, 1963  J. L. MILLER  3,108,651
FLUID BRAKE PEDAL ARRANGEMENT
Filed Sept. 22, 1961  4 Sheets-Sheet 4
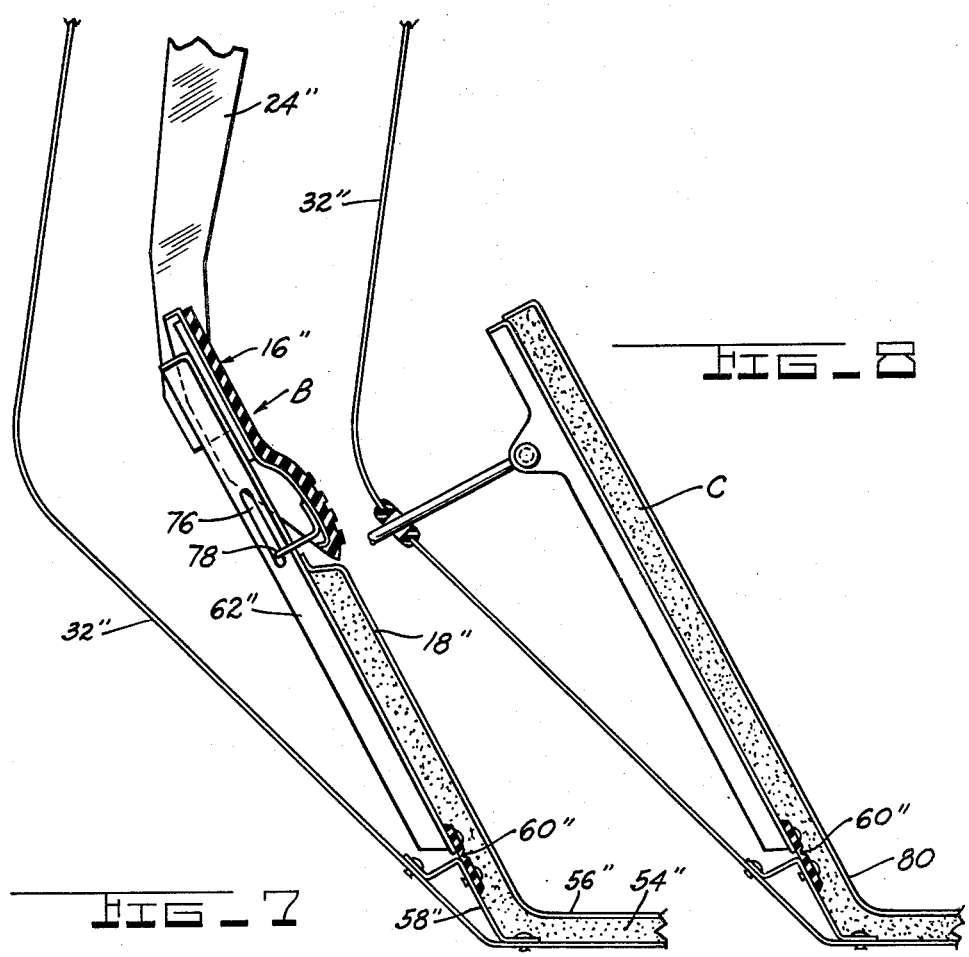
INVENTOR
JOHN L. MILLER.
BY
William P. Hickey
ATTORNEY

# United States Patent Office 3,108,651
Patented Oct. 29, 1963

3,108,651
FLUID BRAKE PEDAL ARRANGEMENT
John L. Miller, South Bend, Ind., assignor to The Bendix Corporation, South Bend, Ind., a corporation of Delaware
Filed Sept. 22, 1961, Ser. No. 140,060
11 Claims. (Cl. 180—90.6)

The present invention relates to a foot control arrangement for an automotive vehicle; and more particularly to a control pedal arrangement which is made part of the floor surface and wherein very little control movement is normally required to operate the vehicle.

An object of the present invention is the provision of a new and improved throttle and brake control arrangement wherein the controls are part of the surface of the floor area and normally require very little foot movement to operate.

Another object of the present invention is the provision of a new and improved control arrangement of the above described type which will permit an operator's foot to accurately adjust and hold various amounts of force on the control portions of the floor surface.

A further object of the present invention is the provision of a new and improved control arrangement of the above described type wherein the brake control normally regulates a power application of the brakes by means of pressure from the operator's foot rather than movement of the operator's foot; and wherein the brakes can be operated manually by a subsequent movement of the control beneath the surface of the floor area.

A more particular object of the present invention is the provision of a new and improved control arrangement of the above described type wherein the transition from the normal pressure responsive type of control to the position responsive type of control can be made during a surprise power failure in accordance with the natural reactions and foot movements of the operator.

A still further object of the present invention is the provision of a new and improved control arrangement of the above described type wherein an operator's foot cannot simultaneously apply both the vehicle's throttle and brake mechanism.

The invention resides in certain constructions and combinations and arrangements of parts; and further objects and advantages of the invention will become apparent to those skilled in the art to which it relates from the following description of several embodiments described with reference to the accompanying drawings forming a part of this specification, and in which:

FIGURE 1 of the drawings is a perspective view of the driver's compartment of automotive vehicle showing a floor and foot control arrangement constructed in accordance with principles of the present invention;

FIGURE 2 is a somewhat schematic view of a hydraulic braking system operated by means of the brake control shown in FIGURE 1;

FIGURE 3 is an enlarged sectional view of the brake control shown in FIGURES 1 and 2 in its normal position;

FIGURE 4 is an enlarged cross section view similar to FIGURE 3 showing the brake control in its position wherein it operates the brakes manually;

FIGURE 5 is an enlarged cross sectional view similar to FIGURE 3 but showing another embodiment of the brake control;

FIGURE 6 is an enlarged cross sectional view showing the brake control of FIGURE 5 in its position wherein it operates the brakes manually;

FIGURE 7 is an enlarged fragmentary cross sectional view of still another embodiment of the brake control; and FIGURE 8 is an enlarged cross sectional view of the throttle control seen in FIGURE 1.

Conventional power braking systems, which are manufactured in the United States today, employ servomotor units in which the brake pedal moves in accordance with the motion of a fluid displacing master cylinder to provide what is known as "follow-up," and thereby appraise the operator of the amount of brake actuation which is being produced. The commercial units being built today further include a feature known as "reaction" wherein a reaction force is delivered to the foot of the operator which is directly proportional to the force being delivered to the vehicle's brakes. Conventional braking systems therefore use both movement, and opposing force to appraise the operator of the amount of braking effort which is being produced. Conventional power braking systems further include an arrangement whereby the brakes can be actuated by manually applied force during power failure of the servomotor. This is conventionally done with the same control lever used to control the power application of the brakes; and for this reason, it has been necessary heretofore to allow for a considerable amount of brake pedal movement in these systems.

Several prior art workers have proposed to operate the brakes of an automotive vehicle with a brake control arrangement that provides "reaction" only as a means of appraising the operator of the amount of braking effort being produced. One of the difficulties found with such systems is that it is difficult to accurately adjust the amount of force being applied to the control pedal particularly where conventional foot pedal lever arrangements have been used. It will be readily apparent that with any control arrangement which does not permit an accurate adjustment of force upon the control, will cause a grabbing of the brakes which throws the weight of the operator forwardly upon the brake control to further aggravate the situation.

According to principles of the present invention, applicant has found that large amounts of force can best be applied to the brake control with the lower calf and ankle muscles held taut and the force applied with the thigh muscles. It has further been found, that where the thigh muscles are used to apply the force, that it is difficult to accurately gauge the amount of force which is being applied; and therefore, where these muscles are used, position response must be depended upon to appraise the operator of the amount of actuation being produced by the braking system. It has further been found that variations in small amounts of applying force can best be regulated by use of the calf muscles with the ankle joint firmly supported in some manner to produce a slight rocking action about the ankle joint. In order that decelerations of the vehicle will not alter the amount of force being applied by the operator's foot, it has been found that the heel of the operator's foot should be anchored against some form of abutment.

According to further principles of the present invention, it has been found that force should be transmitted from the foot to the brake control surface by means of the ball of the foot, in such manner that the distance between the ankle joint and the point of bearing on the brake control surface does not vary appreciably with ankle movement.

According to still further principles of the present invention, it has been found that a transition from the above described pressure control to one where large amounts of physical effort are applied to the brake control surface is best accomplished by an arrangement wherein the ankle joint is flexed; so that the ball of the foot is more in line with the calf bone, and the ball of the foot is thereafter pressed forwardly by means of the thigh muscles. According to these principles, therefore, the preferred brake control arrangement will normally provide an anchor for the heel, so that minor variations in force can be transmitted by the ball of the operator's foot; and will further provide an arrangement which naturally accommodates raising of the heel from the anchor by a rocking action about the ball of the foot and is thereafter actuated by a forward thrust produced by the thigh muscles of the leg of the operator. While such an arrangement may be provided by means of levers positioned above the general floor level of the vehicle, further advantages will be obtained by making the foot pads of the levers as part of the floor area.

The driver's compartment shown in FIGURE 1 generally comprises an operator's seat A which is positioned generally above a floor having a generally horizontal area 10 and a forward portion which is inclined upwardly from the horizontal area at an angle of approximately 60°. The angle at which the forward area 12 is inclined above the horizontal area 10 will depend upon the height of the seat A above the floor, as well as its position rearwardly of the inclined area; so that its angle corresponds to the normal position of an operator's foot when his heel rests upon the inclined portion, and his ankle joint is bent slightly forwardly at a comfortable angle. The surface of the inclined area 12 further includes generally parallel sections forming the brake pedal arrangement B and the throttle pedal arrangement C which are separated by means of a stationary bar 14, which in some instances may be a stationary portion of the inclined floor area 12. The stationary bar 14 serves the purpose of preventing an operator's foot from simultaneously depressing both the brake and the throttle pedals B and C respectively. Brake pedal arrangement B comprises an upper brake actuating pedal 16 which is used to apply force to the brake operating structure; and a lower "trap door" portion 18 which is used to accommodate inward movement of the foot, as will later be explained. The upper brake actuating pedal is provided with a raised pad portion 20 having a generally cylindrical surface which extends across the lower end of the brake pedal 16; so that the ball of the operator's foot will roll thereagainst during inward movement of the pedal 16. The pedal 16 is hinged or pivoted, as at 22, at a position spaced considerably above the pad portion 20; so that the pad portion does not move downwardly, such as would occur if the pedal 16 were hinged below the pad, but instead will move generally in a horizontal plane with a slight amount of upward motion as naturally occurs during flexing of the knee joint. This causes the heel of the operator to be lifted slightly during a depressing of the pedal 16, for reasons which will later be explained. The pedal 16 may be made in any suitable manner, and as shown in the drawing is constructed by means of two bracket portions 24, respective ones of which are positioned adjacent opposite sides of the pad portion 20 and extend upwardly to a hinge 22 that is suitably supported by means of a bracket 26 beneath the instrument panel. Force from the brackets 24 is transmitted to a brake control valve 28 of the type shown and described in the Harold B. Shultz application Serial No. 136,921 assigned to the common assignee by means of the push rod 30, seen in FIGURE 2. The brake control valve 28 is mounted on the firewall 32 of the vehicle, and is a part of the hydraulic brake actuating system, best shown in FIGURE 2.

The brake actuating system shown in FIGURE 2 comprises a belt driven hydraulic pump 34 which delivers pressure to an accumulator 36 through the pressure line 38—which line also communicates with the pressure inlet 40 of the brake control valve 28. Depressing of the pedal 16 causes a modulated pressure to be delivered to the hydraulic output line 42 having branches 44 and 46 leading to the front and rear wheel brakes (not shown) respectively. It will be understood that the front and rear wheel brakes will be of the conventional type having hydraulically actuated pistons which force friction elements, such as shoes, into engagement with rotating structures, such as drums, to provide a retarding torque for the wheels of the vehicle. Upon a release of the pedal 16, the brake control valve 28 exhausts pressure from the hydraulic output line 42 to the exhaust line 48 leading to the suction of the hydraulic pump 34. Suitable means are provided in the pump 34 for "unloading" the pump structure when a predetermined pressure is reached in the line 38; and a check valve is also provided for maintaining this pressure in the line 38.

The brake control valve 28 is of a type which will modulate the pressure in the output line 42, when hydraulic pressure is available with a minimum amount of valve actuating movement. Under normal conditions, therefore, the pad 20 of the brake lever 16 will only move approximately one-eighth of an inch. During this one-eighth of an inch of movement, a reaction force is delivered to the push rod 30 which is directly proportional to the output pressure in the line 42 leading to the front and rear brake structures. The brake control valve 28 is designed to normally actuate the brakes with only moderate amounts of pressure upon the pad 20, which in the preferred embodiment is approximately 50 pounds. The brake control valve 28 is further designed so that upon a hydraulic pump failure, the push rod 30 can be moved inwardly to physically actuate a displacement piston which in turn displaces fluid out into the output line 42 to actuate the brakes. During this inward movement of the push rod 30, the brake pedal 16 will move from its normal control position shown in FIGURE 3 of the drawings to an inner position shown generally in FIGURE 4 of the drawings.

According to principles of the present invention, it has been found highly desirable to provide a stationary abutment for the heel of the operator; so that during normal power operation of the brakes, the pad 20 will be operated by means of a flexing action of the ankle of the operator. The abutment is provided in the embodiment shown in the drawing by providing a stationary ledge portion 50 of the inclined area 12 beneath the trap door portion 18. As shown in FIGURE 3 of the drawings, the floor of the vehicle is made by a piece of sheet metal 52 having a felt pad 54 thereon and over the top of which is positioned a rubber moisture impervious pad 56. A piece of sheet metal 58 is positioned beneath the portion of the pad 56 forming the inclined surface area 12 to provide the ledge portion 50; and the trap door 18 is hinged as at 60 to the sheet metal portion 58. The trap door 18 generally comprises a metal frame 62 which generally abuts the bottom of the pedal portion 16, so that it will at all times be moved by the pedal 16. The pad 54 and rubber pad 56 are shown extending up over the frame 62 to a position just short of the pad 20; and movement from the pedal 16 is transmitted to the trap door 18 by means of a nylon coated abutment 64 passing through the pedal 16 adjacent the lower edge of the pad 20. The trap door 18 is held or biased against the abutment 64 in such manner that the amount of force required to move the trap door does not increase appreciably as the pedal 16 is moved inwardly; and in the preferred embodiment shown in the drawing, is so biased by means of a tension coil spring 66 positioned between the firewall 32 and the top of the frame 62. The tension coil spring 66 has a very low spring rate and in addition is so positioned that its length is not increased appreciably during the rotation of the trap door 18.

In normal operation of the pedal arrangement shown in FIGURE 3, the operator's heel rests against the ledge 50 and actuating pressure is applied to the pad 20 from the ball of the operator's foot by means of a very slight rocking action about the ankle joint as produced by the calf muscles of the operator's leg. This permits the operator to accurately modulate the force applied to the pad 20; inasmuch as the ankle is adequately braced, and the point of transferring force from the foot to the pedal 16 does not vary either with position or amount of force being applied. This is true by reason of the raised generally cylindrical surface of the pad 20 which confines the force transmittal to the ball of the operator's foot.

The operator will usually become aware of the fact that a power failure has occurred by the lack of reaction force against his foot and the attendant brake control movement. It is a natural response of the operator at this time to rock his foot forwardly about the ankle joint so as to apply greater force to the brake pedal. This natural rocking action lifts the heel of the operator off of the ledge 50 to automatically change the position of the foot from a force modulating condition to a motion modulating condition. With the operator's heel off of the ledge 50, he thrusts his leg forwardly causing the heel of the operator's foot to bear against the trap door 18 which thereupon yields to accommodate the forward motion of the heel. Inasmuch as the pedal 16 is hinged an appreciable distance above the pad 20, the ball of the operator's foot and hence the ankle further tends to be lifted upwardly away from the ledge 50, so that no interference occurs with the manual actuation of the brakes. Adjustment of the manually applied braking effort will be modulated thereafter in the conventional fashion so that no further explanation is believed necessary. As previously mentioned, a stationary support or bar is positioned between the brake pedal arrangement B and the control levering arrangement C; so that if the operator chooses to operate both pedal arrangements with his right foot, he cannot simultaneously depress both the brake and throttle levers.

Still other embodiments of the invention can be made. One such embodiment is shown in FIGURES 5 and 6 of the drawings, wherein those portions which correspond to similar portions of the embodiments shown in FIGURES 1 and 2 are designated by like reference numerals, characterized further in that a prime mark is affixed thereto. The principal difference between the embodiment shown in FIGURES 5 and 6 from that shown in the above described embodiment occurs in the manner in which the trap door 18' is supported. In the embodiment shown in FIGURES 5 and 6, the top edge of the trap door 62' is hinged, as at 68, to the bottom of the brake pedal 16' adjacent the position where the abutment 64 of the previously described embodiment was located. The lower end of the trap door 18' is caused to bear against a stationary ledge or abutment 58'; so that the lower edge of the trap door 18' generally pivots about and slides over the abutment 58' during inward movement of the trap door. In order to prevent the metal clicking sound, and in order to produce ease of actuation, a nylon strip 70 is suitably affixed to one of the surfaces of the trap door or abutment; and these surfaces are normally held into engagement with each other by means of a suitable spring 72 positioned between the pedal 16' and the trap door frame 62'. The spring 72 may be a leaf spring; and as shown in the drawing, may also be a tension coil spring similar to the spring 66 used in the previous embodiment. The spring 72 is fastened to a stationary bracket on the bottom of frame 62'; so that tension rotates the frame 62' about the hinge 68 to pull the bottom of the trap door 18' into engagement with the abutment 58'. In the embodiment shown in FIGURES 5 and 6, the bottom edge of the frame 62' extends upwardly to the general surface of the floor mat, and a rubber strip 74 is attached thereto to provide a seal with respect to the floor mat 56' during normal power actuation of the system. When the system must be actuated manually, the lower edge of the trap door 18' pivots about the ledge 58' and rides upwardly in a fashion generally corresponding to the normal action of the operator's foot; so that some support can be given thereto during the manual actuation of the braking system.

Still other arrangements of the brake pedal section B can be made, as for example that shown in FIGURE 7 of the drawings. Those portions of FIGURE 7 which correspond to the structure of the previously described embodiments will be designated by a like reference numeral, characterized further in that a double prime mark is affixed thereto. In the embodiment shown in FIGURE 7, the upper edge of the trap door 18" is made in the general manner of that shown in FIGURE 3, except that a slot and pin arrangement is used between the trap door and the brake pedal 16" to hold the trap door in its normal position. In the embodiment shown in FIGURE 7, opposite side edges of the frame 62" are provided with a longitudinally extending slot 76, and the center portion of a wire 78 extends through the slot 76 with the opposite ends of the wire being bent upwardly and fastened to the pedal 16 in the approximate location of the previously described abutment 64. In the embodiment shown in FIGURE 7, the normal means which is used to return the pedal 16" to its retracted position also moves the trap door 18" to its normal position without the aid of an additional spring structure.

Although the manner in which the throttle pedal C is constructed and operated is not a necessary part of the present invention, particular advantages occur when the throttle pedal C is hinged about an axis which is coextensive with that of the hinge 60, and a ledge portion 80 is also provided against which the heel of the operator may bear, as is shown in FIGURE 8. The throttle control shown in FIGURE 8 is intended to be position responsive.

It will be apparent that the objects heretofore enumerated as well as others have been accomplished, and that there has been provided a new and improved floor and control pedal arrangement, or console, which permits an automotive vehicle to be operated more comfortably and accurately than has been possible heretofore.

While the invention has been described in considerable detail, I do not wish to be limited to the particular construction shown and described and it is my intention to cover hereby all novel adaptations, modifications and arrangements thereof which come within the practice of those skilled in the art to which the invention relates.

We claim:

1. In controls for a vehicle: a floorboard having adjacent horizontal and inclined areas, said inclined area having an upwardly extending section which includes a raised portion spaced from said horizontal area and normally contacted by the ball of the operator's foot and which raised portion is adapted to be depressed beneath the level of said inclined area, said upwardly extending section forming a control with said raised portion a distance away from said horizontal area being hinged above said upwardly extending section for movement below the surface of said inclined area, and said upwardly extending section forming said control also including a movable section below said raised portion said movable section being hingedly connected at its lower end to said horizontal area of said floorboard to allow inward movement of said operator's foot during depressing of said control without appreciable resistance.

2. In controls for a vehicle: a floorboard having adjacent horizontal and inclined areas, said inclined area having generally parallel sections thereof each of which includes a portion spaced from said horizontal area, which portion is normally contacted by the ball of the operator's foot and which parallel sections form an accelerator control and a brake control which controls are adapted to be depressed beneath the level of said inclined area, said inclined area including a rigid stationary portion between said controls which prevents both controls from being depressed simultaneously by a single foot of the operator, said parallel section forming said brake control having a hinged upper portion with a raised pad portion extending across said section at said predetermined distance away from said horizontal area and being hinged above said upwardly extending section for movement below the surface of said inclined area, and said parallel section forming said brake control also including a movable section below said pad which accommodates inward movement of said operator's foot during depressing of said brake control.

3. In controls for a vehicle: a floorboard having adjacent horizontal and inclined areas, said inclined area having generally parallel sections thereof each of which includes a portion normally contacted by the ball of the operator's foot and which form an accelerator control and a brake control which are adapted to be depressed beneath the level of said inclined area, said portion being spaced from said horizontal area, said inclined area including a rigid stationary portion between said controls which prevents both controls from being depressed simultaneously by a single foot of the operator, said accelerator control being hinged adjacent said horizontal area with a stationary portion of said inclined area between said accelerator control and said horizontal area, said parallel section forming said brake control having a hinged upper portion with a raised pad portion extending across said section at said predetermined distance away from said horizontal area and being hinged above said upwardly extending section for movement below the surface of said inclined area, said parallel section forming said brake control also including a movable section below said pad which accommodates inward movement of said operator's foot during depressing of said brake control and an abutment adjacent the lower edge of said movable section to provide a support for the heel of the operator's foot.

4. In controls for a vehicle: a floorboard having adjacent horizontal and inclined areas, said inclined area having generally parallel sections thereof each of which includes a portion normally contacted by the ball of the operator's foot which portion is spaced a distance away from said horizontal area and which portions form an accelerator control and a brake control which are adapted to be depressed beneath the level of said inclined area, said inclined area including a rigid stationary portion between said controls which prevents both controls from being depressed simultaneously by a single foot of the operator, said accelerator control being hinged adjacent said horizontal area with a stationary portion of said inclined area between said accelerator control and said horizontal area, said parallel section forming said brake control having a hinged upper portion with a raised pad portion extending across said section at said predetermined distance away from said horizontal area and being hinged above said upwardly extending section for movement below the surface of said inclined area, said parallel section forming said brake control also including a movable section below said pad which accommodates inward movement of said operator's foot during depressing of said brake control and a stationary ledge portion between said movable section and said horizontal area, and means hinging said movable section to said stationary ledge portion.

5. In controls for a vehicle: a floorboard having adjacent horizontal and inclined areas, said inclined area having generally parallel sections thereof each of which includes at a distance from said horizontal area a portion normally contacted by the ball of thet operator's foot and which form an accelerator control and a brake control which are adapted to be depressed beneath the level of said inclined area, said inclined area including a rigid stationary portion between said controls whch prevents both controls from being depressed simultaneously by a single foot of the operator, said accelerator control being hinged adjacent said horizontal area with a stationary portion of said inclined area between said accelerator control and said horizontal area, said parallel section forming said brake control having a hinged upper portion with a raised pad portion extending across said section at said predetermined distance away from said horizontal area and being hinged above said upwardly extending section for movement below the surface of said inclined area, said parallel section forming said brake control also including a movable section below said pad which accommodates inward movement of said operator's foot during depressing of said brake control, an abutment adjacent the lower edge of said movable section to provide a support for the heel of the operator's foot, and a spring of very low spring rate biasing said movable section to its flush position with the surface of said inclined area.

6. In controls for a vehicle: a floorboard having adjacent horizontal and inclined areas, said inclined area having generally parallel sections thereof each of which includes at a distance from said horizontal area a portion normally contacted by the ball of the operator's foot and which portions form an accelerator control and a brake control which are adapted to be depressed beneath the level of said inclined area including a rigid stationary portion between said controls which prevents both controls from being depressed simultaneously by a single foot of the operator, said accelerator control being hinged adjacent said horizontal area with a stationary portion of said inclined area between said accelerator control and said horizontal area, said parallel section forming said brake control having a hinged upper portion with a raised pad portion extending across said section at said predetermined distance away from said horizontal area and being hinged above said upwardly extending section for movement below the surface of said inclined area, said parallel section forming said brake control also including a movable section below said pad which accommodates inward movement of said operator's foot during depressing of said brake control, a stationary ledge portion between said movable section and said horizontal area, means hinging said movable section to said stationary ledge portion, said movable section being operatively connected to said upper portion, and a spring of very low spring rate biasing said movable section to its flush position with the surface of said inclined area.

7. In controls for a vehicle: a floorboard having adjacent horizontal and inclined areas, said inclined area having generally parallel sections thereof each of which includes a portion spaced from said horizontal area which portion is normally contacted by the ball of the operator's foot and which portions form an accelerator control and a brake control which are adapted to be depressed beneath the level of said inclined area, said inclined area including a rigid stationary portion between said controls which prevents both controls from being depressed simultaneously by a single foot of the operator, said accelerator control being hinged adjacent said horizontal area with a stationary portion of said inclined area between said accelerator control and said horizontal area, said parallel section forming said brake control having a hinged upper portion with a raised pad portion extending across said section at said predetermined distance away from said horizontal area and being hinged above said upwardly extending section for movement below the surface of said inclined area, said parallel section forming said brake control also including a movable section below said pad which accommodates inward movement of said operator's foot during depressing of said brake control, an abutment adjacent the lower edge of said movable section for limiting inward movement of the heel of the operator's foot, said movable section being pivotally supported by said upper portion and pivotally abutted at its lower end by said abutment, and a spring of very low spring rate biasing said movable section to its flush position with the surface of said inclined area.

8. In controls for a vehicle: a floorboard having adjacent horizontal and inclined areas, said inclined area having a portion extending across said inclined area and spaced a predetermined distance away from said horizontal section which inclined area is formed with generally parallel sections each of which locates said portion to be contacted by the ball of an operator's foot and which form an accelerator control and a brake control which are adapted to be depressed beneath the level of said inclined area, said inclined area; including a rigid stationary portion between said controls which prevents both controls from being depressed simultaneously by a single foot of the operator, said parallel section forming said brake control having a hinged upper portion with a raised pad portion extending across said section at said predetermined distance away from said horizontal area and being hinged above said upwardly extending section for movement below the surface of said inclined area, said parallel section forming said brake control also including a movable section below said pad which accommodates inward movement of said operator's foot during depressing of said brake control.

9. In controls for a vehicle according to claim 8 wherein said inclined area includes a stationary ledge portion adjacent said horizontal area.

10. In controls for a vehicle according to claim 9 and further including a hinge means connecting said accelerator control and said movable section to said stationary ledge portion.

11. In controls for a vehicle according to claim 8 but further comprising a slot and pin means connecting the upper portion of said movable section to said hinged upper portion.

References Cited in the file of this patent

UNITED STATES PATENTS

| | | |
|---|---|---|
| 2,853,144 | Mench | Sept. 23, 1958 |
| 2,912,081 | Strauss | Nov. 10, 1959 |
| 2,983,347 | Risk | May 9, 1961 |

FOREIGN PATENTS

| | | |
|---|---|---|
| 360,367 | France | Feb. 21, 1906 |